United States Patent
Matsumoto et al.

(10) Patent No.: US 6,417,819 B1
(45) Date of Patent: Jul. 9, 2002

(54) BACKGROUND IMAGE DISPLAY CONTROL SYSTEM USED IN CHAT SYSTEM

(75) Inventors: Yasuhide Matsumoto; Masahiko Murakami; Sumiyo Okada, all of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/216,983

(22) Filed: Dec. 21, 1998

(30) Foreign Application Priority Data

Dec. 25, 1997 (JP) .............................................. 9-358011

(51) Int. Cl.⁷ ................................................. G09G 5/00
(52) U.S. Cl. ........................................ 345/1.1; 345/629
(58) Field of Search ........................... 345/1, 2, 3, 629, 345/636, 637, 640, 1.1, 1.2, 1.3, 2.1, 2.2, 2.3; 707/526, 527, 528, 10, 529, 531

(56) References Cited

U.S. PATENT DOCUMENTS 6,003,032 A * 12/1999 Bunney et al. ................ 707/10
6,038,296 A * 3/2000 Brunson et al. ............. 379/100
6,157,956 A * 12/2000 Jensen et al. ................ 709/246
6,199,082 B1 * 3/2001 Ferrel et al. ................. 707/522
6,205,432 B1 * 3/2001 Gabbard et al. .............. 707/14

FOREIGN PATENT DOCUMENTS

JP          10-190729       7/1998

* cited by examiner

*Primary Examiner*—Xiao Wu
(74) *Attorney, Agent, or Firm*—Staas & Halsey LLP (57) ABSTRACT

A background image display control system is applied to a chat system in which a server performs a broadcast communication control of character information between a plurality of user computers connected to a channel in a network. The background Image display control system causes each of the plurality of user computers to display an image in a background of chat character strings based on the character information. The background image display control system includes a table storage unit for storing a table indicating relationships between conditions based on states revealable in the chat system and background images, and a display control unit for causing each of the plurality of user computers to display a background image in the background of the chat character strings when a condition corresponding to a state revealed in the chat system corresponds to the background image in the table.

11 Claims, 12 Drawing Sheets

| MESSAGE ITEM | EVALUATION ITEM | | | | PRIORITY | ALL IMAGE MANAGEMENT TABLE ID |
|---|---|---|---|---|---|---|
| | CONDITION | KEYWORD | SPEAKER | REFUSAL | | |
| MODE CHANGE | SECRET | — | boyoyon | — | 10 | 3 |
| | PASS WORD | — | * | — | 4 | 5 |
| | ⋮ | ⋮ | ⋮ | ⋮ | ⋮ | ⋮ |
| TOPIC CHANGE | — | CONFERENCE | * | — | 7 | 8 |
| | ⋮ | ⋮ | ⋮ | ⋮ | ⋮ | ⋮ |
| PARTICIPATION / LEAVING | 10 USERS OR MORE | — | — | — | 5 | 10 |
| | 10 USERS OR LESS | — | — | — | 2 | 12 |
| | — | — | boss | — | 1 | 11 |
| | ⋮ | ⋮ | ⋮ | ⋮ | ⋮ | ⋮ |
| TIME | 1998/12/24 | — | — | — | 10 | 7 |
| | 8:00 AM | — | — | — | 3 | 6 |
| | ⋮ | ⋮ | ⋮ | ⋮ | ⋮ | ⋮ |
| SPEECH | | URGENT | * | — | 5 | 9 |
| | — | — | boss | ○ | 5 | 5 |
| | — | CIRCULATION | secretary | — | 3 | 24 |
| | 10 LINES/min OR MORE | — | a b c | — | 5 | 58 |
| | 10 LINES/min OR LESS | — | — | — | 10 | 17 |
| | ⋮ | ⋮ | ⋮ | ⋮ | ⋮ | ⋮ |

FIG.7

| ALL IMAGE MANAGEMENT TABLE ID | BACKGROUND IMAGE SETTING | | | CHARACTER STRING SETTING | |
|---|---|---|---|---|---|
| | IMAGE IDENTIFIER | DISPLAY POSITION | TRANSMISSION BETWEEN USERS | CHARACTER STRING | DISPLAY POSITION |
| 1 | face.gif | 100.200 | ○ | $STOPIC | 100.200 |
| 2 | ID35 | 100.200 | × | "DON'T FORGET PASSWORD" | 100.200 |
| 3 | maruhi-gif | 100.200 | × | — | 100.200 |
| 4 | ID35 | 100.200 | × | $SKEYWORD | 100.200 |
| 5 | http://...haikei.gif | 100.200 | × | $SKEYWORD | 100.200 |
| --- | | | | --- | |

FIG. 8

| ALL IMAGE MANAGEMENT TABLE ID | PRIORITY |
|---|---|
| 25 | 5 |

| FILE | EDIT | SET | CHANNEL | COMAND | URL | HELP |

AAAAA

AAAAA  aaaa
        bbbb  cccc
        cccc  dddd
        dddd  eeee
        eeee  ...
        bbbb

▶ SCREEN STOP

```
08:57  aaaa
09:58  bbbb    GOOD MORNING.
10:46  ccccc   LET'S MAKE APRANGEMENT→ all
16:06  ddddd   1 ABC16T6C7
16:06  eeeee  [I WILL FORMALL ANSWER NON-DESIDED PRICE IN THE
               FEATURE
16:06  bbbbb   2 ABC26T6C5                          ⌈MONTHLY REPORT CONFERENCE⌉
        232,000                                      603 CONFERENCE ROOM
16:06  ccccc           ABC526T6C5
16:06  eeeee  [THIS IS ROUGH ESTIMATE OF MACHINE ]
16:06  bbbbb   3 ABC31T5C7        XX-AT                     ]    232,000
        209,000
16:06  ccccc           ABC 6200T    MODEL3.2GCN                  209,000
16:06  bbbbb   4 ABC 50T5C5        XX-AT                         199,000
```

C3

C2 nickname

BACKGROUND IMAGE DISPLAY CONTROL SYSTEM USED IN CHAT SYSTEM

BACKGROUND OF THE INVENTION

1. Field of the Invention

The present invention relates to a background image display control system used in a chat system in which a management server performs a broadcast control of character information between computers connected to a predetermined channel in a network so that users of the user computers converse with each other. The background image display control system causes each of the respective user computers to display an image in a background of conversational characters based on received character information.

2. Description of the Related Art

For example, the following system used in a chat system in which a user of a computer connected to a network converses with a user of another computer has been proposed. In the system, a program for displaying an background image is installed in each of the user computers, so that the background image is displayed on each of the user computers in a chat operation. According to such a system, a user of a computer in which the program for displaying the background image is installed can visually know the contents of the chat and visually enjoy the chat.

However, in the conventional system, the program for displaying the background image is individually installed in each of the user computers, so that the background image is not displayed in a user computer in which the program is not installed.

In addition, in a case where different programs are installed in the respective user computers, different background images are displayed in the respective user computers in the chat. Further, the conventional program does not causes each of the user computers to display a background image depending on states of the chat system and/or revealed contents of the chat.

SUMMARY OF THE INVENTION

Accordingly, a general object of the present invention is to provide a novel and useful background image display control system, used in a chat system, in which the disadvantages of the aforementioned prior art are eliminated.

A specific object of the present invention is to provide a background image display control system, used in a chat system, in which a unified background image suitable for the conversation can displayed in the background of characters in the respective user computers.

The above objects of the present invention are achieved by a background image display control system, applied to a chat system in which a server performs a broadcast communication control of character information between a plurality of user computers connected to a channel in a network, for causing each of the plurality of user computers to display an image in a background of chat character strings based on the character information, the background image display control system comprising: table storage means for storing a table indicating relationships between conditions based on states revealable in the chat system and background images; and display control means for causing each of the plurality of user computers to display a background image in the background of the chat character strings when a condition corresponding to a state revealed in the chat system corresponds to the background image in the table.

According to the present invention, the server performs the broadcast communication control of the character information between the plurality of user computers. As a result, chat character strings are displayed in each of the plurality of user computers. When a condition corresponding to a state revealed in the chat system is indicated in the table, a background image corresponding to the condition in the table is displayed in the background of the character strings in each of the plurality of user computers.

The state revealable in the chat system is a state which can be revealed in a chat between users using the chat system. The state may include a mode state of a channel, a state of topic in a channel, a number of participant (corresponding to a number of user computers) in a channel, a state of a time at which a chat is performed, a state of the contents of a chat, a state of a speaker (a specific speaker) in a chat, a state of the increase/decrease of the number of participants, a state of an amount of speech in a chat (an amount of character information in the broadcast communication) and a state of a keyword used in a chat.

To display a background image corresponding to one of a plurality of conditions when the plurality of conditions corresponding to a state revealed in the chat system are indicated in the table, the table include priority orders each of which corresponds to one of the conditions, and the background image control system may comprises condition selecting means for selecting a condition corresponding to a higher priority order in the table when a plurality of conditions corresponding to the state revealed in the chat system are indicated in the table, wherein the display control means causes each of the plurality of user computers to display a background image corresponding to the condition selected by the condition selecting means in the background of the chat character strings.

The background image display control system may be provided in each of the user computers, one of the user computers, the server, and another computer connected to the network. The functions of the background image display control system may be distributed among a plurality of computers connected to the network.

For easy maintenance of image data representing the background images, image data storage means for storing image data representing the background images may be provided in the server, so that the image data representing the background image is transmitted from the server to each of the plurality of user computers.

To decrease the load of the server, the image storage means may be provided in one of the plurality of user computers, so that the image data representing the background image is transmitted from the one of the plurality of user computers to other user computers.

In addition, the table storage means and the display control means may be provided in each of the plurality of user computers.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of an embodiment of the present invention.

Figure 1:
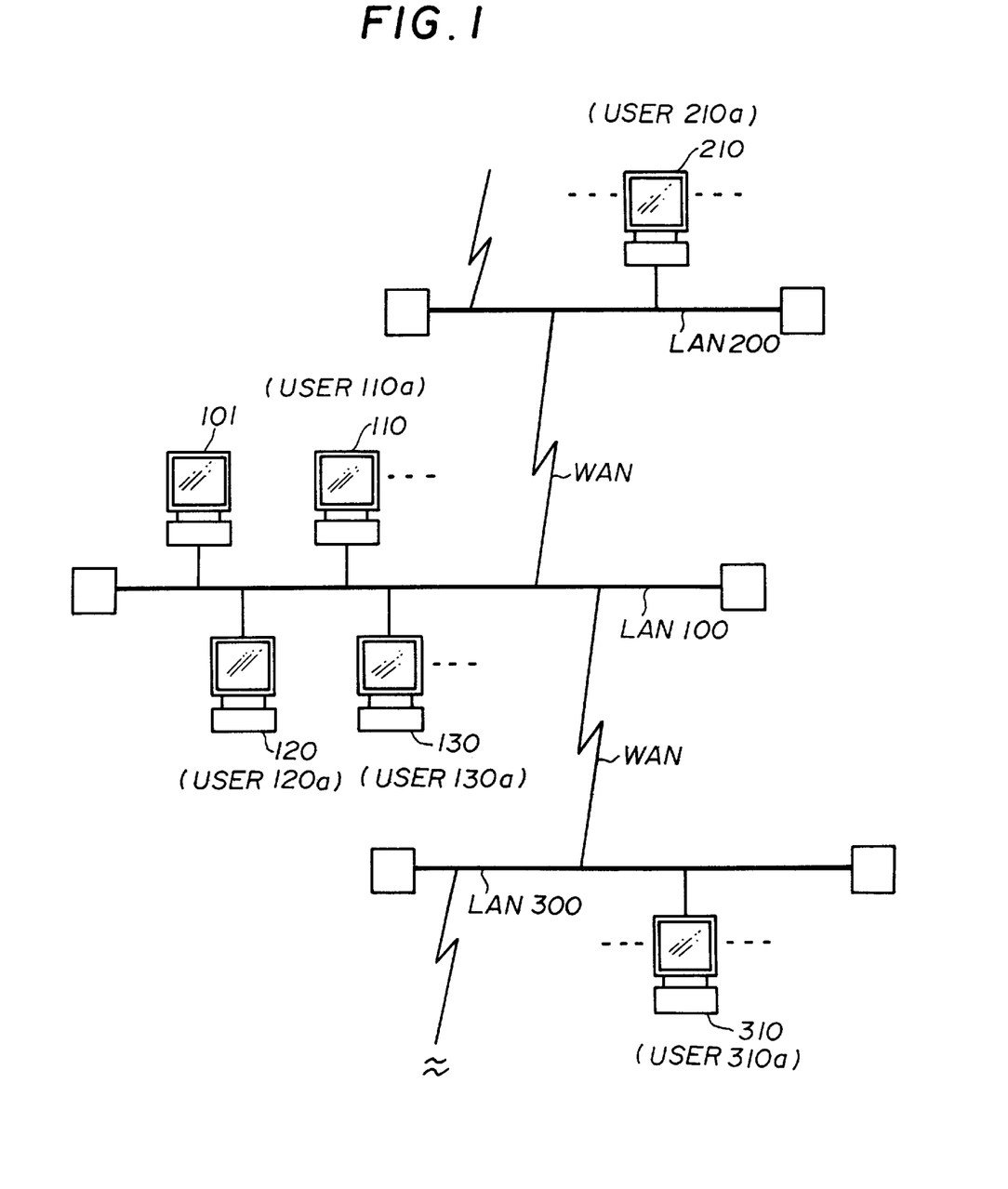
FIG. 1 is a diagram illustrating a whole structure of a computer network in which a background image display control system according to an embodiment of the present invention.

A computer network to which a background image display control system according to an embodiment of the present invention is formed as shown in FIG. 1.

As shown in FIG. 1, a LAN (Local Area Network) 100 is connected with a plurality of user computers 110, 120, 130, . . . and a server 101. In addition, other LANs 200 and 300 are connected with a plurality of user computers 210, . . . and 310, . . . The respective LANs 100, 200 and 300 are connected to each other by a WAN (Wide Area Network) so that a computer network is implemented in a wide area.

A background image display control system according to the embodiment of the present invention is used, for example, in a chat system formed in such a computer network system as described above.

The chat system is a system in which a plurality of users can chat with each other via computers connected to a computer network, such as the internet or a personal computer communication network.

The chat system has a plurality of channels. A user of a user computer connected to a channel can know speeches of users of other user computers connected to the channel by looking at a display panel of the user computer. In addition, a speech of the user is input to an input unit of the user computer and the input contents of the speech is transmitted to the other user computers via the computer network.

Figure 2:
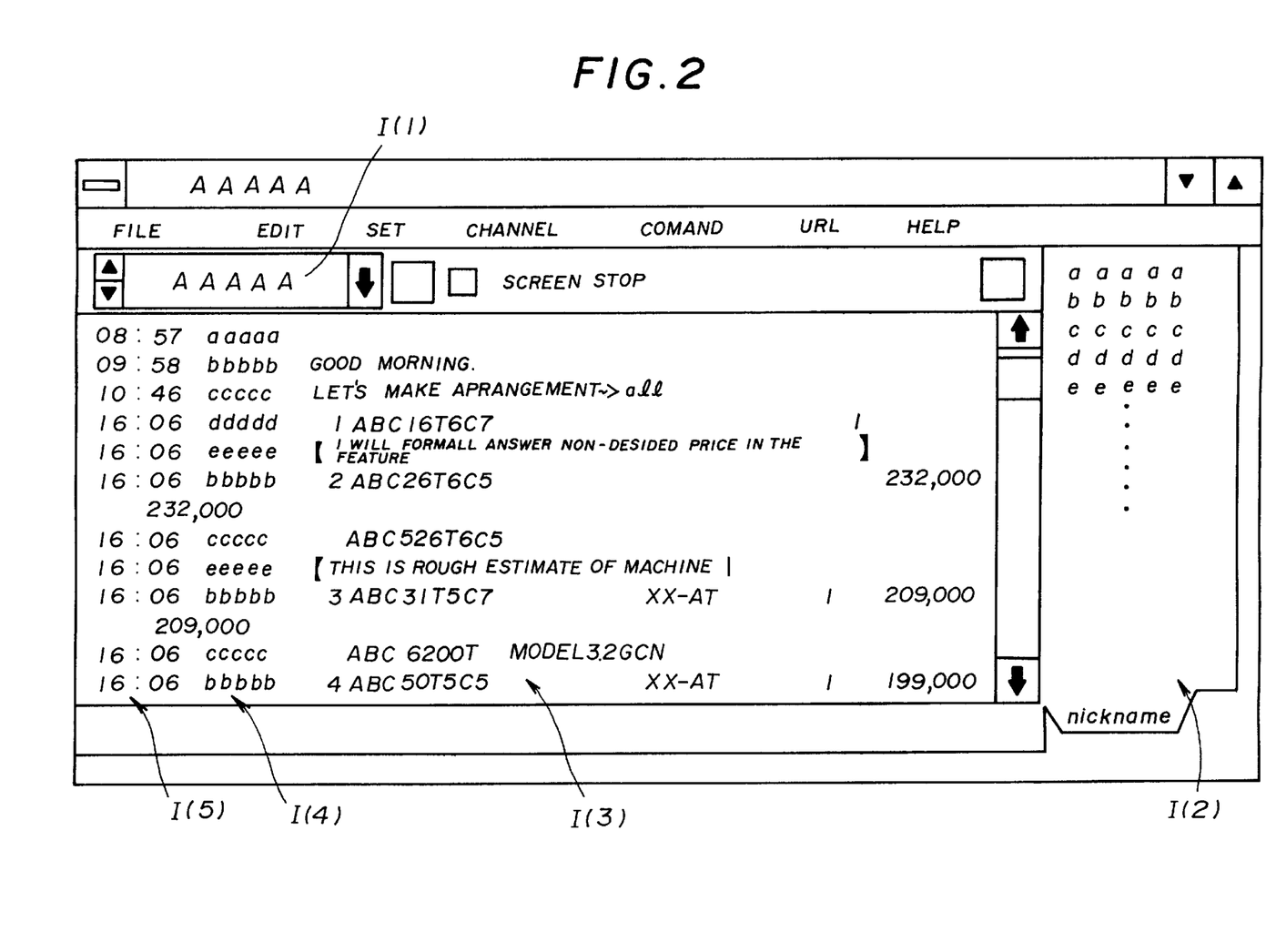
FIG. 2 is a diagram illustrating an example of a display screen of a computer in a chat operation.

The contents of the speeches in the chat system are displayed, on a display screen of each of all the user computers connected to the channel, as character strings in an order of speech. FIG. 2 shows an example of a display screen of the user computer used for the chat. On the display screen, users having nicknames "aaaaa", "bbbbb", "ccccc", "ddddd", "eeeee" . . . chat with each other about prices of computers in a channel AAAAA. As shown in FIG. 2, on the display screen, a channel name I(1), a list I(2) of nicknames of the users participating in the chat, contents I(3) of speeches, nicknames I(4) of users giving respective speeches and speech times I(5) and the like are displayed.

Figure 3:
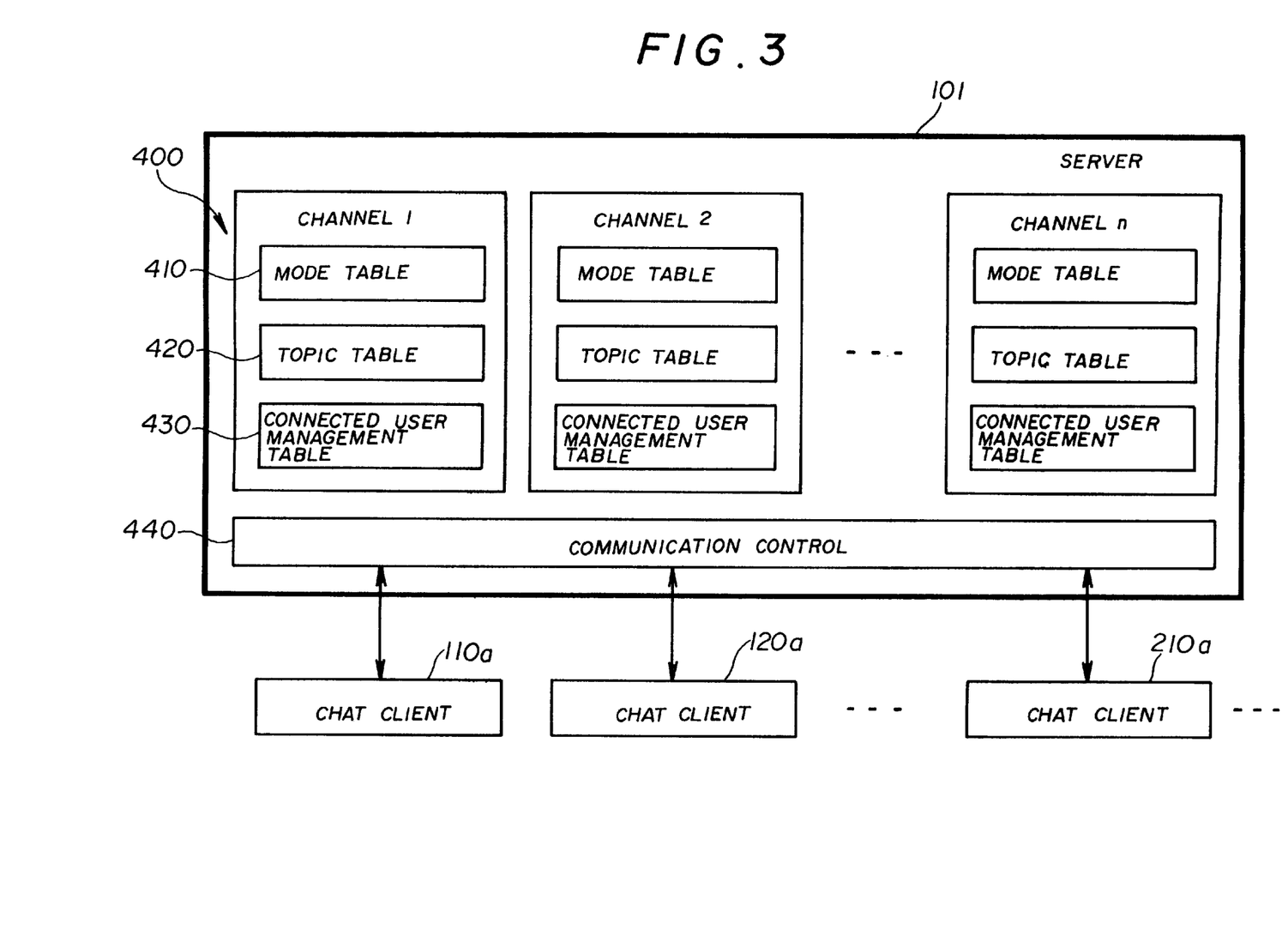
FIG. 3 is a block diagram illustrating a functional structure of a server.

The server 101 has a functional structure shown in FIG. 3. The server 101 functions as a management server in the present system. Referring to FIG. 3, the server 101 has a chat management table 400. Names of users participating in the chat, the contents of speeches, characteristics of a channel in which the chat is carried out and the like are recorded in the chat management table 400. The chat management table 400 is provided for each of channels. The server 101 manages each of the channels in the chat system based on the chat management table 400 provided for each of the channels.

The chat management table 400 is provided with a mode table 410, a topic table 420 and a user management table 430. A managing mode of a channel is recorded in the mode table 410. Key words for a topic in a channel are recorded in the topic table 420. Various kinds of user information of users connected to a channel are recorded in the user management table 430.

The modes recorded in the mode table 410 includes a secret mode and a password mode. The secret mode is a channel mode which is not known by users other than users participating in the chat in such mode. The password mode is a channel mode in which users can participate in a chat when inputting a password.

The server 101 receives contents of a speech transmitted, for example, from a user 110a via a communication control unit 440. The server 101 recognizes, with reference to the chat management table 400, attribute values of a channel, such as contents of speeches, names of speakers, a number of participants in the chat, names of participants, increase or decrease of the number of participants and speech times. The server 101 transmits the contents of speeches to all users connected to the channel to which the user 101a belongs. When change of attribute values, such as change of the mode, change of the topic, change of the number of participants in the chat, occurs, the server 101 transmits messages to the users connected to the channel.

The message includes not only information of changed attribute values but also information of all the attribute values themselves of the channel.

In the above chat system, data can be directly transmitted between user computers not via the sever 101. The data in this case includes electronic information such as information of images and character strings.

Figure 4:
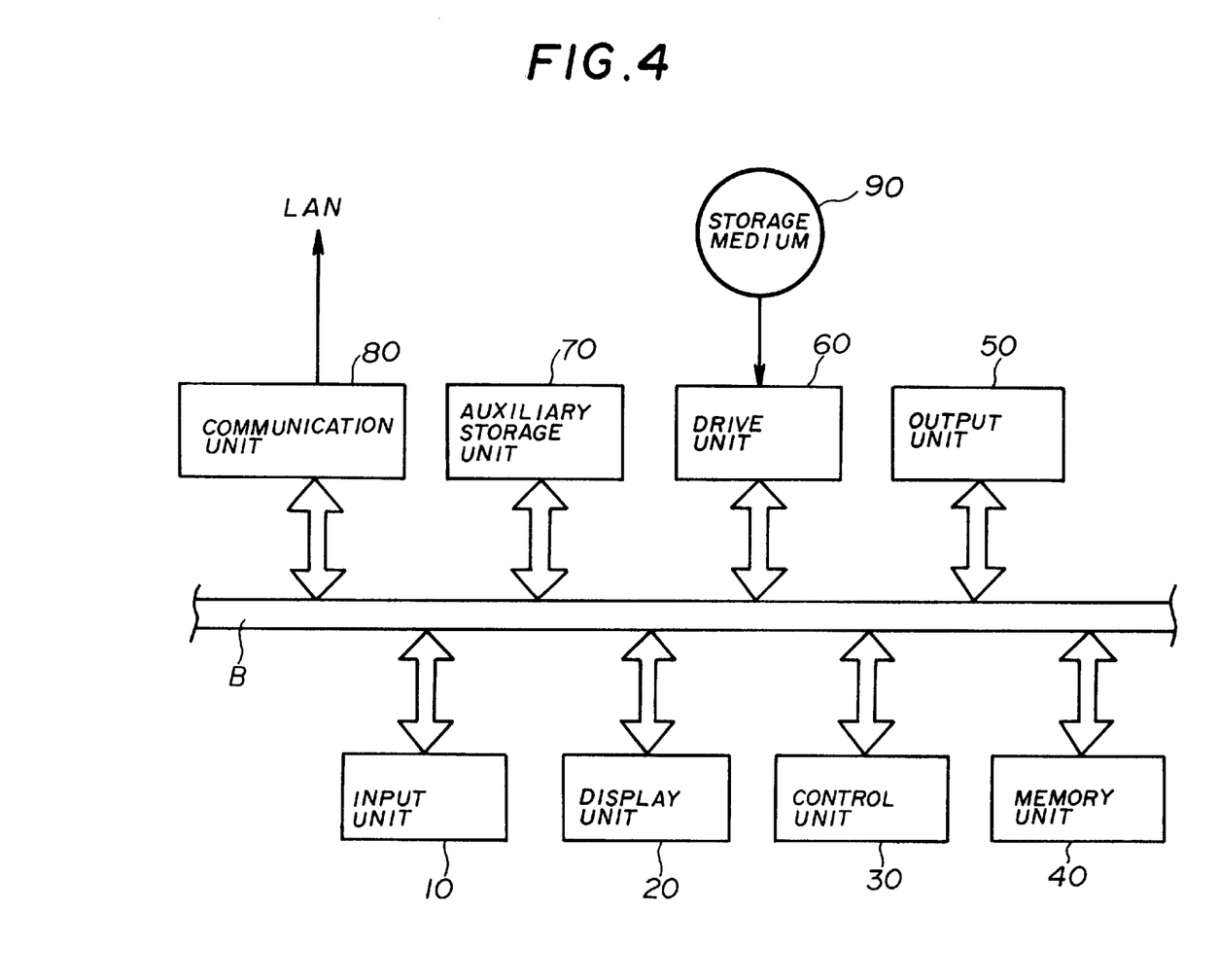
FIG. 4 is a block diagram illustrating a hardware structure of each of user computers.

The hardware structure of the user computer 110 shown in FIG. 1 is formed as shown in FIG. 4. Each of user computers other than the user computer 110 has the same structure as the user computer 110.

Referring to FIG. 4, the user computer 110 has an input unit 10, a display unit 20, a control unit 30, a memory unit 40, an output unit 50, a drive unit 60, a auxiliary storage unit 70 and a communication unit 80 all of which are connected by a bus B.

The input unit 10 includes a keyboard and a mouse operated by a user and is used to input various kinds of information to the computer system. The display unit 20 displays various kinds of windows based on input information from the input unit 10 and contents of chat with other users via the computer network. The output unit 50 outputs, based on instructions from the control unit 20, prints of information stored in the memory unit 40 and the contents on the screen displayed on the display unit 20.

A program 91 for utilizing the background image display control system in the user computer is supplied by a storage medium 90 such as a CD-ROM. The storage medium 90 storing the program 91 is set in the drive unit 60 and the program 91 read out from the storage medium 90 by the drive unit 60 is installed in the auxiliary storage unit 70. The auxiliary storage unit 70 stores the program 91 executed when the background image display system operates, a displayed image setting table, an all image management table, a displayed image management table and a plurality of background images.

The communication unit 80 is an interface to transmit and receive data to and from other computers via the computer network.

Figure 5:
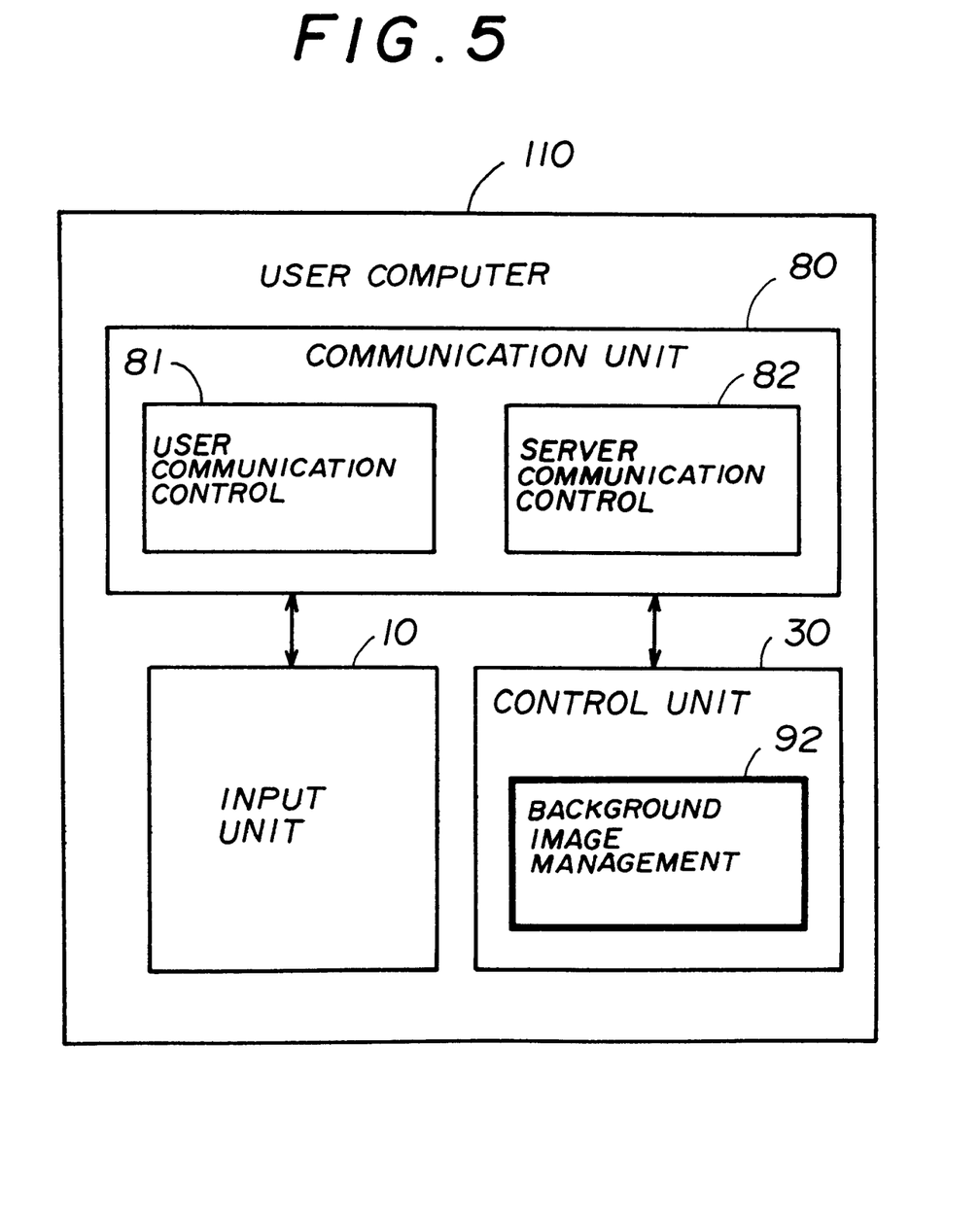
FIG. 5 is a block diagram illustrating a functional structure of a background image display control system formed in each of the user computers.

The background image display control system implemented in the user computer 110 is functionally formed as shown in FIG. 5.

Referring to FIG. 5, the communication unit 80 has a user communication control portion 81 and a server communication control portion 82. The user computer 110 transmits and receives information to and from other user computers via the user communication control portion 81. In addition, the user computer 110 transmits and receives information to and from the server 101 via the server communication control portion 82.

A background image management portion 92 controls a background image displayed, via the control unit 30, on the display screen in the chat. Specifically, the background image management portion 92 causes the display unit 20 to display a background image corresponding to a message received from the server 101, with reference to the tables stored in the auxiliary storage unit 70.

The background image management portion 92 is implemented by a part of the program 91 executed in the present system. In addition, the background image management portion 92 may be formed as a module in the user computer 110.

Figure 6:
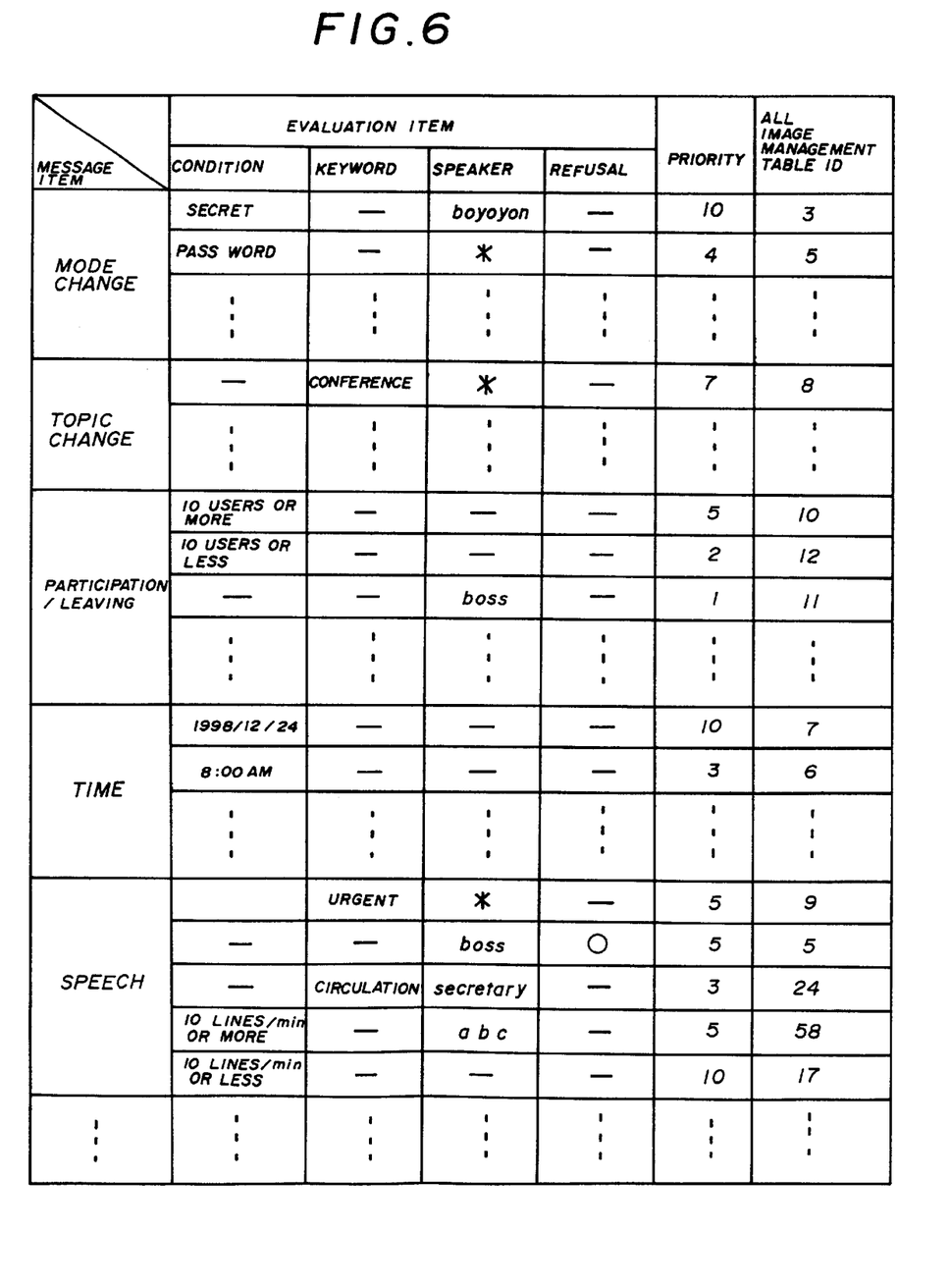
FIG. 6 is a diagram illustrating a display image setting table.

The displayed image setting table stored in the auxiliary storage unit 70 is formed as shown in FIG. 6. The displayed image setting table is used to retrieve a background image corresponding to a message from the all image management table ID when the user computer receives, from the server 101, the message informing of change of the attribute values of the channel.

As shown in FIG. 6, the displayed image setting table has a message item column, an evaluation item column, a priority order column and an all image management ID column. In the message item column, messages from the server 101 is classified based on the change of attribute values of the channel. There are MODE CHANGE, TOPIC CHANGE, PARTICIPATION/LEAVING (of users), TIME and SPEECH as the message items.

In the evaluation item column, an evaluation of each of messages classified in the message item column is set. The evaluation item column includes CONDITION, KEY WORD, SPEAKER, and REFUSAL as items. It is determined whether information included in a message corresponds to each of the items. Based on the determination result, a priority order for the massage and an all image management ID corresponding to the priority order are specified.

In the item CONITION of the displayed image setting table, "10 or more" and "10 or less" indicate the number of participants in the chat channel. "1998/12/24" and "8:00" indicate a time at which a corresponding background image should be displayed. "10 lines/min or more" and "10 lines/min or less" indicate a amount of speeches by one minute.

In the item KEY WORD, keywords, such as "conference", "urgent", "circulation" are set. If a keyword is included in a speech, a row in which the keyword is set is retrieved. In addition, if a speaker set in the item SPEAKER speaks, a corresponding row is retrieved from the displayed image setting table.

In addition, when a message for which a mark ○ (valid) is set in the item REFUSAL is transmitted, a background image which is displayed at this time will be continuously displayed in the display unit 20. Another background image is not displayed until a user carries out a refusal canceling operation.

In FIG. 6, "−" indicates that a value of the evaluation item has not yet set. "*" indicates an arbitrary character string.

Figure 7:
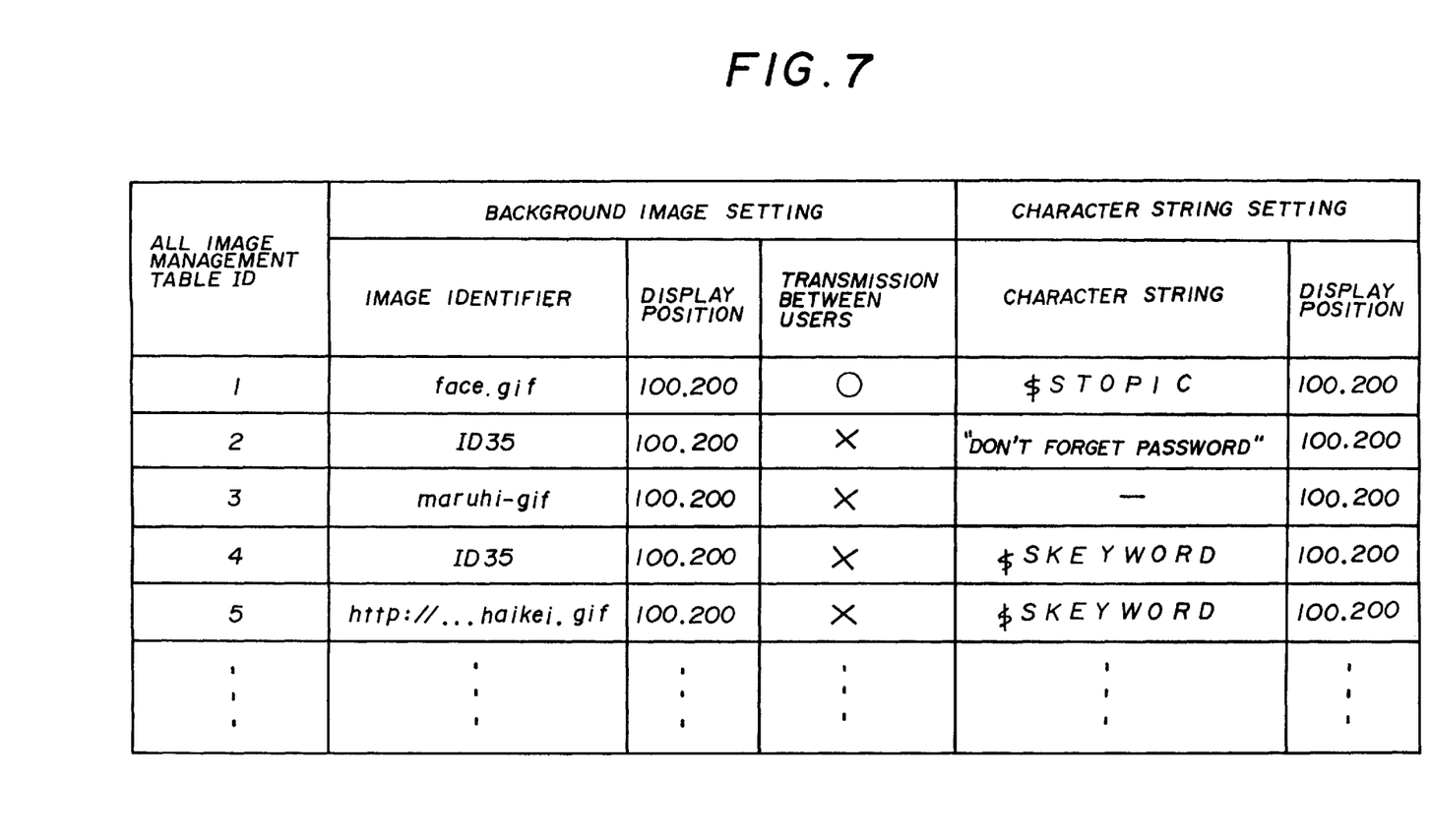
FIG. 7 is a diagram illustrating an image management table.

The all image management table is formed as shown in FIG. 7.

In the all image management table, the all image management table IDs corresponds to background images, character strings and display positions at which the background images and the character strings are displayed.

Referring to FIG. 7, the all image management table has a "background image setting column" and a "character string setting column". The "background image setting column" is provided with items of "IMAGE IDENTIFIER", "DISPLAY POSITION" and "TRANSMISSION BETWEEN USERS". The "character string setting column" is provided with items of "CHARACTER STRING" and "DISPLAY POSITION". The image identifier is a character string identifying a background image to be displayed in the display unit 20. Background image data corresponding to an image identifier is read out from the auxiliary storage unit 70 and displayed in the display unit 20. The display position identifies a position at which a background image or a character string.

A background image corresponding to an all image management ID for which a mark ○ is set in the item "TRANSMISSION BETWEEN USERS" can be directly transmit from one user computer to another not via the server 101. On the other hand, a background image. corresponding to an all image management ID for which a mark X is set in the item "TRANSMISSION BETWEEN USERS" can not be directly one user computer to another.

Each of the character strings set in the item "CHARACTER STRING" is displayed together with a corresponding one of the background images at a predetermined position.

A character string "$TOPIC" in the item "CHARACTER STRING" means a topic at a time at which a corresponding background image is displayed. When a background image for which the character string "$TOPIC" set in the item "CHARACTER STRING" is displayed, a character string representing a topic at this time is displayed together with the background image.

In addition, a character string "$KEYWORD" means a keyword which has been set when a corresponding background image is displayed. When a background image for which the character string "$KEYWORD" is set in the item "CHARACTER STRING" is displayed, a character string of a keyword used to retrieve the background image is displayed together with the background image.

Figure 8:
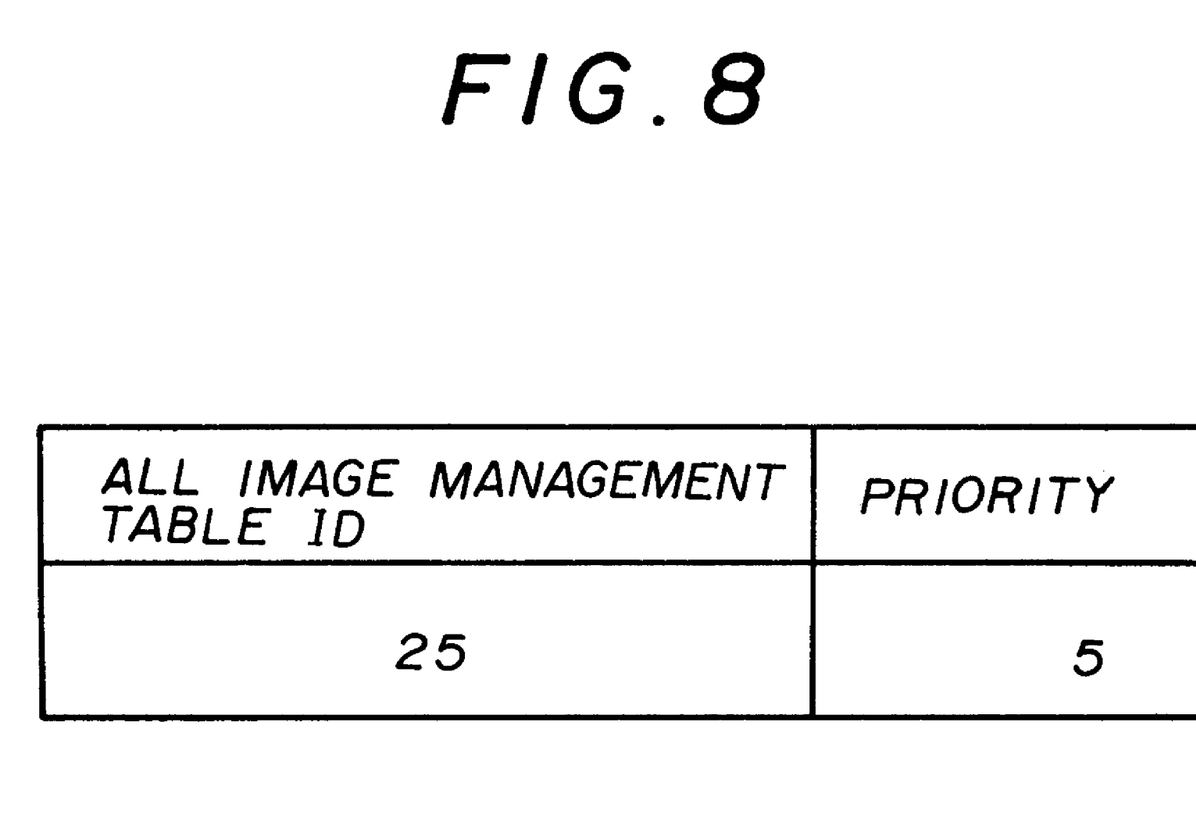
FIG. 8 is a diagram illustrating a current displayed image management table.

The displayed image management table is formed as shown in FIG. 8.

Referring to FIG. 8, the displayed image management table indicates an all image management table ID identifying a background image which is displayed now in the display unit 20 and a priority order of the background image. When a new background image is requested to be displayed, the priority order set in the displayed image management table is compared with a priority order corresponding to an all image management table ID identifying the new background image in the displayed image setting table (see FIG. 7). If the priority order for the new background image is higher than the priority order for the background image which has been displayed, the new background image is displayed in the display unit 20.

The background image data stored in the auxiliary storage unit 70 represents various background images which should be displayed in the display unit 20 under various conditions. For example, a background image of a crowd can cause users to recognize, at a look, that there are many participant in the chat. In addition, a character string of "UERGENT" or a red background can cause users to recognize, at a look, that contents of chat is urgent for the users.

Users can make the respective tables and the background images by operations of the input unit 10. In addition, the respective tables and the background images stored in a storage medium, such as a CD-ROM, can be supplied to the system. Further, the respective table and the background images can be received from other computers via the computer network.

A description will now be given, with reference to FIGS. 9–12, of operations of the background image display control system according to the embodiment of the present invention.

In the chat in an N-channel using the computer network as shown in FIG. 1, when a user 120 gives a speech using the computer 120, information about the speech is transmitted to the server 101.

The server 101 analyzes the contents of the speech from the user 120a based on the chat management table 400. It is then determined whether the contents of the speech means the change of an attribute value of the N-channel. If it is determined that the contents of the speech do not mean the change of the attribute value of the N-channel, only the contents of the speech is transmitted to all user computers connected to the N-channel. In each of the user computers, the received contents of the speech are displayed in the display unit 20.

On the other hand, when it is determined that the contents of the speech mean the change of the attribute value of the N-channel, the contents of the speech, a message to the effect that the attribute value of the N-channel has been changed and information of the attribute value of the N-channel are transmitted to all the user computers connected to the N-channel.

Figure 9:
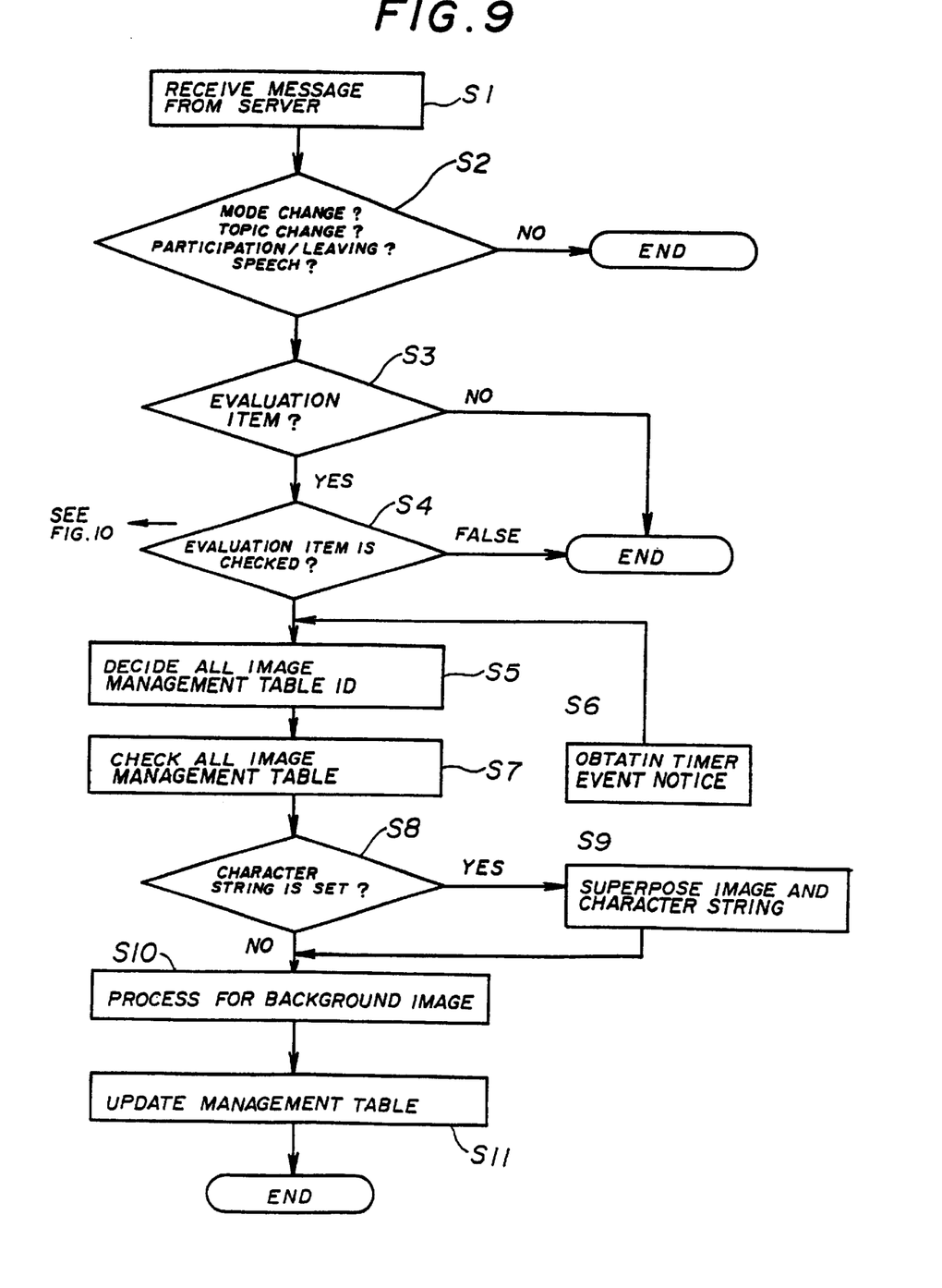
FIG. 9 is a flowchart illustrating a procedure of a process executed in each of the user computers.

In a case where the message to the effect that the attribute value of the N-channel has been changed and the information of the attribute value of the N-channel are transmitted from the server 101 to the user computer 110 used by the user 110a, the user computer 110 carries out a process in accordance with a procedure as shown in FIG. 9.

Referring to FIG. 9, when the control unit 30 of the user computer 110 receives the message and the information as described above from the server 101 via the communication unit 80 (S1), the control unit 30 determines, with reference to the displayed image setting table, which message item the received message belongs to (S2). When the received message does not belong to any message item in the displayed image setting table, the process in the present background image display control is terminated.

If it is determined, in step S2, that the received message belongs to one of the message items, the control unit 30 determines whether there is at least one or more evaluation items, corresponding to the one of the message items, in which one or more values are set (S3). If there is no evaluation item in which one or more values are set, the process in the present background image display control system is terminated.

If there is at least one evaluation item, corresponding to the message item, in which one or more values are set, the control unit 30 evaluates the message based on the values in the evaluation item corresponding to the message item (S4). A priority order for the message is then decided (S4). After this, the control unit 30 compares the priority order decided in step S4 with a priority value recorded in the displayed image management table as the priority value corresponding to a background image which is displayed now.

Figure 10:
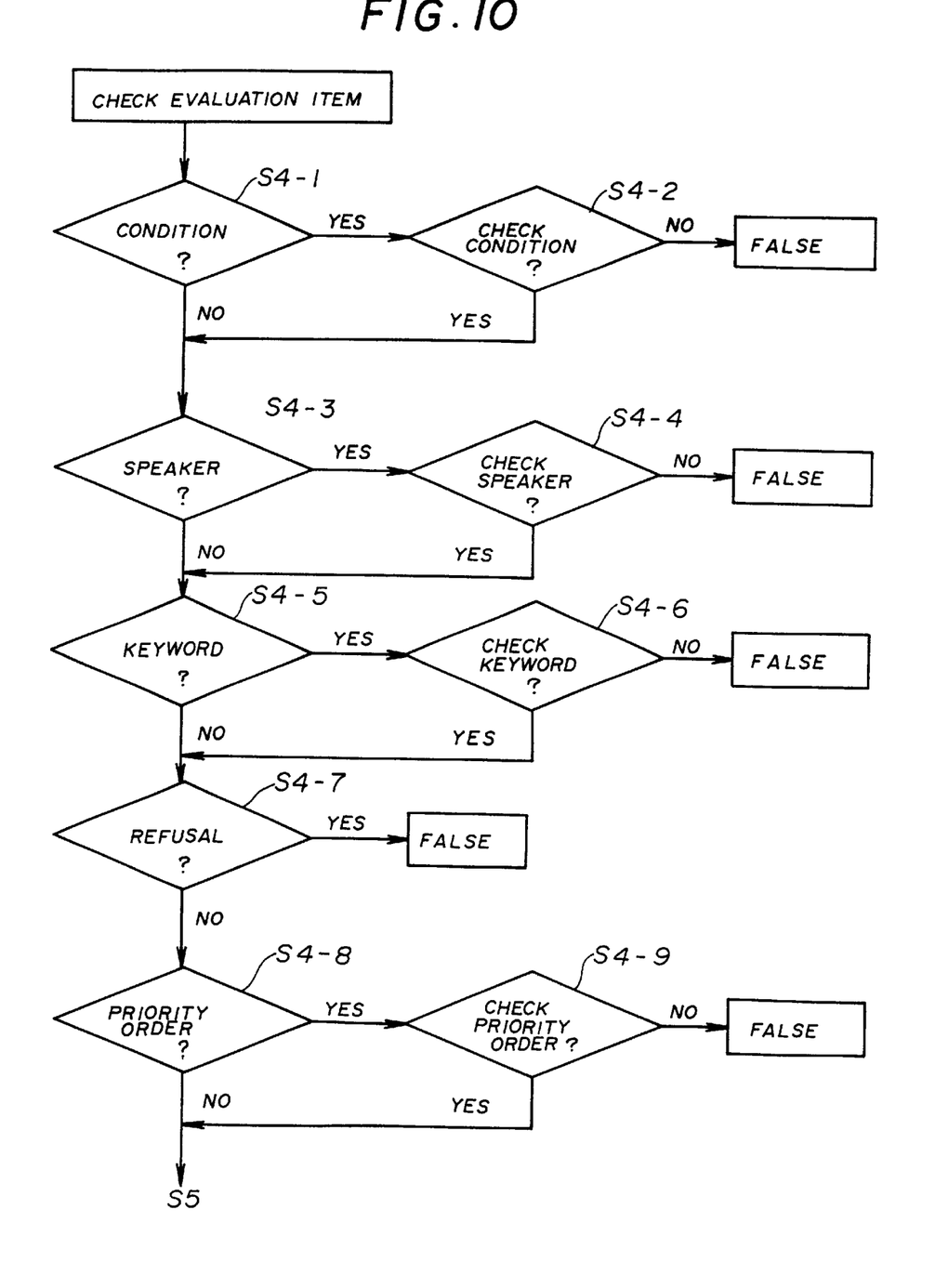
FIG. 10 is a flowchart illustrating a procedure of an evaluation process for evaluated items.

A process in step 4 is executed in accordance with a procedure as shown in FIG. 10.

Referring to FIG. 10, the control unit 30 determines whether one or more values (conditions) are set in the item "CONDITION" in the evaluation item column corresponding to the message item identified, in step S2, in the displayed image setting table (see FIG. 6) (S4-1). If no value is set in the item "CONDITION", the control unit 30 further determines whether one or more values (speakers) are set in the item "SPEAKER" corresponding to the message item identified, in step S2, in the displayed image setting table (S4-3).

On the other hand, if one or more values are set in the item "CONDITION" in the displayed image setting table, the control unit 30 checks, in step S4-2, whether there is a value (a condition) corresponding to information (message information) included in the message in the item "CONDITION". If there is no value corresponding to the message information in the item "CONDITION", the control unit 30 outputs a result of "FALSE" and the process is then terminated.

On the other hand, if it is checked, in step S4-2, that there is a value (a condition) corresponding to the message information in the item "CONDITION", the control unit 30 executes step S4-3 with resect a row in which the value corresponding to the message information is set in the item "CONDITION" in the displayed image table.

If it is then determined, in step S4-3, that there is no value (no speaker) in the item "SPEAKER" in the displayed image setting table, the control unit 30 further determines, in step S4-5, whether one or more values (keywords) are set in the item "KEYWORD" in the displayed image setting table.

On the other hand, it is determined, in step S4-3, that one or more values (speakers) are set in the item "SPEAKER" in the displayed image setting table, the control unit 30 checks, in step S4-4, whether there is a value corresponding to a speaker included in the message information in the item "SPEAKER". If a determination result that there is no value corresponding to the speaker included in the message information in the item "SPEAKER" is obtained in step S4-4, the control unit 30 outputs the result of "FALSE" and the process is terminated.

On the other hand, if a determination result that the speaker included in the message information is set as a value in the item "SPEAKER" is obtained in step S4-4, the control unit 30 executes step S4-5 with respect to a row in which the speaker included in the message information is set as a value in the item "SPEAKER".

If it is determined, in step S4-5, that no value (no keyword) is set in the item "KEYWORD" in the displayed image setting table, the control unit 30 further determines whether one or more values (valid) are set in the item "REFUSAL" corresponding to the message item specified, in step S2, in the displayed image setting table (S4-7). On the other hand, if it is determined, in step S4-5, that one or more values (keywords) are set in the item "KEYWORD" in the displayed image setting table, the control unit 30 checks, in step S4-6, whether there is a value (a keyword) corresponding to a keyword included in the message information in the item "KEYWORD" in the displayed image setting table.

If a check result that there is no value corresponding to the keyword included in the message information in the item "KEYWORD" is obtained in step S4-6, the control unit 30 outputs the result of "FALSE" and the process is terminated. On the other hand, a check result that there is a value corresponding to the keyword included in the message information in the item "KEYWORD" is obtained in step S4-6, the control unit 30 executes step S4-7 with respect to a row in which the value corresponding to the keyword is set in the item "KEYWORD".

If it is determined, in step S4-7, that no value (valid) is set in the item "REFUSAL" in the displayed image setting table, the control unit 30 determines, in step S4-8, whether values (priority-orders) are set in the priority order column in the displayed image setting table. On the other hand, if it is determined, in step S4-7, that a value is set in the item "REFUSAL", the control unit 30 outputs the result of "FALSE" and the process is terminated.

If it is determined, in step S4-8, that no value is set in the priority value column, the process proceeds to step S5 shown in FIG. 9. On the other hand, it is determined, in step S4-8, that a value is set in the priority value column, the control unit 30 compares the priority order (the value), corresponding to the message information, set in the priority column with a priority value set in the displayed image management table (see FIG. 8). In a case where the priority order corresponding to the massage information is lower than the priority order set in the displayed image management table, the control unit 30 outputs a result of "FALSE" and the process is terminated. On the other hand, in a case where the priority order corresponding to the message information is higher than the priority order set in the displayed image management table, an all image management table ID corresponding to the priority order set in the priority order column is decided (S5).

Returning to FIG. 9, in a case where one or more values (times) set in the item "CONDITION" corresponding to the message item "TIME", the control unit 30 obtains timer event notice when the present time reaches a value (a time) set in the item "CONDITION" corresponding to the message item "TIME". The process from step S4-8 is then executed with respect to a row in which the value set in the item "CONDITION" corresponding to the message item "TIMEX".

On the other hand, when the all image management table ID is decided in step S5, the control unit 30 searches the all image management table (S7) and determines, in step S8, whether a character string corresponding to the decided all image management table ID is set. If the character string is set, the control unit 30 recognizes that a background image and character string corresponding to the decided all image management table ID should be displayed and causes the display unit 20 to display the background image together with the character string (S10).

On the other hand, If a character string is not set for the decided all image management table ID, the control unit 30 recognizes that only a background image corresponding to the decided all image management table ID should be displayed and causes the display unit 20 to display the background image (S10). Further, the control unit 30 updates the displayed image management table (see FIG. 8) so that the all image management table ID and the priority order both of which correspond to the background image displayed in step S10 are substituted for those set in the displayed image management table (S11). The process is then terminated.

Figure 11:
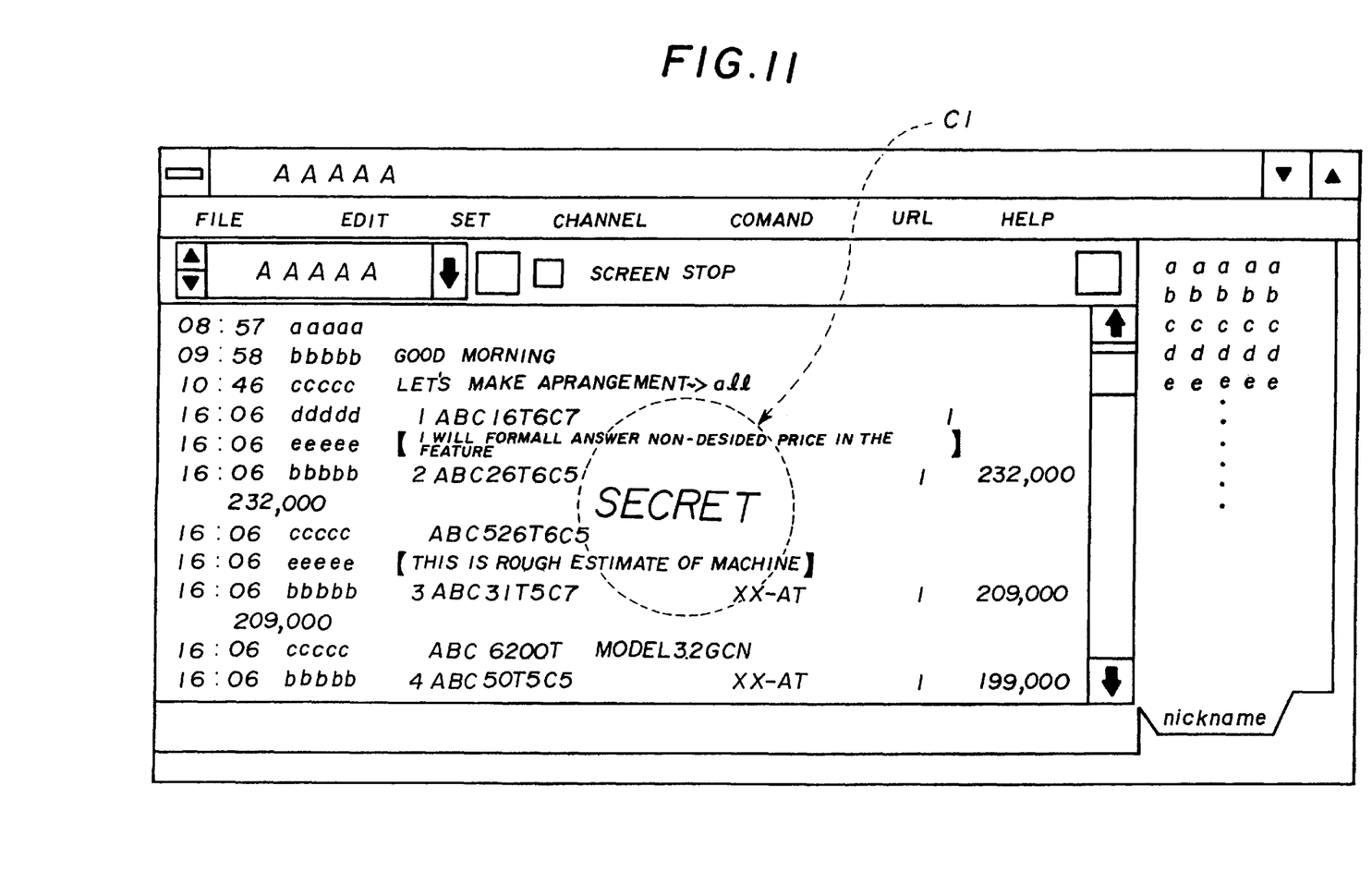
FIG. 11 is a diagram illustrating an example of a background image for a chat channel in a secret mode.
Figure 12:
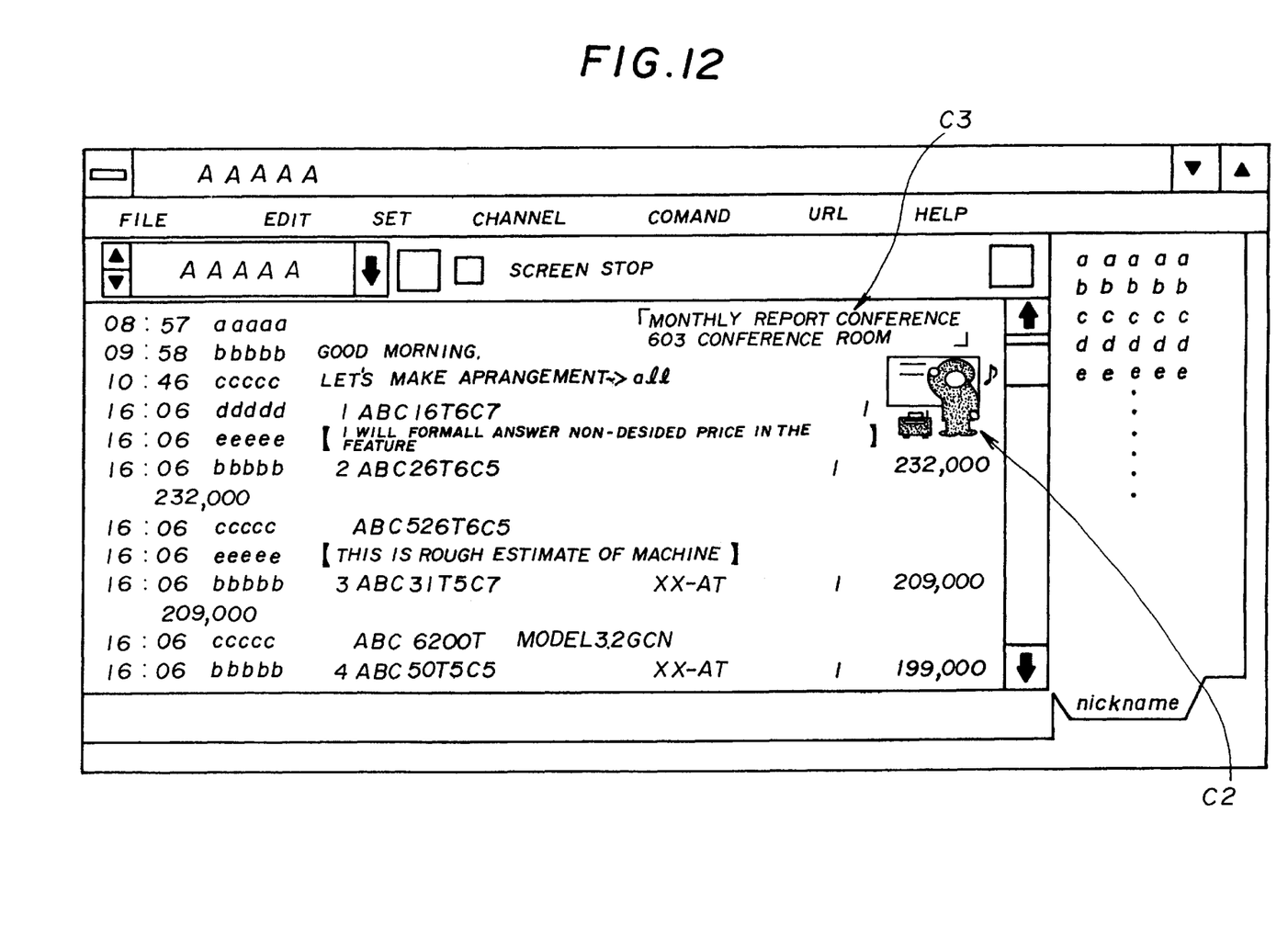
FIG. 12 is a diagram illustrating an example of a background image for a chat channel to which a "conference" is assigned as a topic word.

FIGS. 11 and 12 show a background image for a chat channel in the secret mode and a background image for a chat channel in which a keyword is conference.

For example, the all image management table ID is decided as "3". in the displayed image setting table shown in FIG. 6 in the process from steps S1 through S5, and a background image C1 corresponding to the decided all image management table ID "3" is displayed. In this case, the background image shown in FIG. 11 is displayed in the display unit 20 in each of the user computers.

In addition, for example, the all image management table ID is decided as "8" in the displayed image setting table shown in FIG. 6 in the process from steps S1 through S5, and a background image C2 and a character string C3 both of which correspond to the all image management table ID "8" are superposed and displayed. In this case, the background image and the character string "MANTHLY REPORT CONFERENCE 603 CONFERENCE ROOM" shown in FIG. 12 are displayed in the display unit 20 in each of the user computers.

In the background image display control system, a plurality of background images may be simultaneously displayed in the display unit 20. In this case, for example, the screen of the display unit 20 is divided into an area used to. display a background image based on a topic and an area used to display a background image based on a keyword included in a speech.

The present invention is not limited to the aforementioned embodiments, and other variations and modifications may be made without departing from the scope of the claimed invention.

The present application is based on Japanese priority application No.9-358011 filed on Dec. 25, 1997, the entire contents of which are hereby incorporated by reference.

What is claimed is:

1. A background image display control system, applied to a chat system in which a server performs a broadcast communication control of character information between a plurality of user computers connected to a channel in a network, for causing each of said plurality of user computers to display an image in a background of chat character strings based on the character information, said background image display control system comprising:

table storage means for storing a table indicating relationships between conditions based on states revealable in said chat system and background images; and display control means for causing each of said plurality of user computers to display a background image in the background of the chat character strings when a condition corresponding to a state revealed by information received in said chat system corresponds to the background image in said table.

2. The background image display control unit as claimed in claim 1, wherein said table include priority orders each of which corresponds to one of the conditions, said system further comprising:

condition selecting means for selecting a condition corresponding to a higher priority order in said table when a plurality of conditions corresponding to the state revealed in said chat system are indicated in said table, wherein said display control means causes each of said plurality of user computers to display a background image corresponding to the condition selected by said condition selecting means in the background of the chat character strings.

3. The background image display system as claimed in claim 1, wherein said display control means comprises:
   image data storage means for storing image data for the background image indicated in said table, wherein image data representing the background image corresponding to the condition is read our from said image data storage means and said display control means causes each of said plurality of user computers to display the background image based on the image data.

4. The background image display control system as claimed in claim 3, wherein said image data storage means is provided in said server, so that the image data representing the background image is transmitted from said server to each of said plurality of user computers.

5. The background image display control system as claimed in claim 3, wherein said image storage means is provided in one of said plurality of user computers, so that the image data representing the background image is transmitted from said one of said plurality of user computers to other user computers.

6. The background image display control system as claimed in claim 1, wherein said table storage means and said display control means are provided in each of said plurality of user computers.

7. The background image display control system as claimed in claim 6, wherein said display control means comprises:
   image data storage means for storing image data for the background image indicated in said table, wherein image data representing the The background image corresponding to the condition is read our from said image data storage means and said display control means causes a user computer having said image data storage means to display the background image based on the image data.

8. The background image display control system as claimed in claim 1, said display control means causes each of plurality of user computers to display a plurality of background images when a plurality of conditions corresponding to a plurality of states revealed in said chat system correspond to said plurality of background images in said table.

9. The background image display control system as claimed in claim 1, said table storage means stores character string setting table indicating character strings corresponding to the background images, wherein said display control means causes each of said plurality of user computers to display the background image and the character string corresponding to the background image in said character string setting table.

10. A computer readable storage medium storing a program causing a computer to execute a process in a background image display control system, applied to a chat system in which a server performs a broadcast communication control of character information between a plurality of user computers connected to a channel in-a network, for causing each of said plurality of user computers, with reference to a table, to display an image in background of chat character strings based on the character information, said table indicating relationships between conditions based on states revealable in said chat system and background images, said program comprising:
   a display control procedure for causing each of said plurality of user computers to display a background image in the background of the chat character strings when a condition corresponding to a state revealed by information received in said chat system corresponds to the background image in said table.

11. A background image display control system, applied to a chat system in which a server performs a broadcast communication control of character information between user computers connected to a channel in a network, causing each of said user computers to display an image in a background of chat character strings based on the character information, said background image display control system comprising:
   a table storage unit storing a table indicating relationships between conditions based on states revealable in said chat system and background images; and
   a display control unit causing each of said plurality of user computers to display a background image in the background of the chat character strings when a condition corresponding to a state revealed by information received in said chat system corresponds to the background image in said table storage unit.

* * * * *

UNITED STATES PATENT AND TRADEMARK OFFICE
CERTIFICATE OF CORRECTION

PATENT NO.   : 6,417,819 B1
DATED        : July 9, 2002
INVENTOR(S)  : Yasuhide Matsumoto et al.

It is certified that error appears in the above-identified patent and that said Letters Patent is hereby corrected as shown below:

<u>Column 11,</u>
Line 9, change "our" to -- out --.
Line 33, change "the The" to -- the --.
Line 34, change "our" to -- out --.

Signed and Sealed this

Twenty-ninth Day of October, 2002

*Attest:*

*Attesting Officer*

JAMES E. ROGAN
*Director of the United States Patent and Trademark Office*